(12) United States Patent
Almadi

(10) Patent No.: US 11,916,591 B2
(45) Date of Patent: Feb. 27, 2024

(54) SYSTEMS AND METHODS FOR SECURELY EXCHANGING DATA BETWEEN COMPUTER SYSTEMS USING FREE SPACE OPTICAL COMMUNICATIONS

(71) Applicant: Saudi Arabian Oil Company, Dhahran (SA)

(72) Inventor: Soloman M. Almadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/503,630

(22) Filed: Oct. 18, 2021

(65) Prior Publication Data

US 2023/0121744 A1    Apr. 20, 2023

(51) Int. Cl.
| | |
|---|---|
| *H04B 10/11* | (2013.01) |
| *H04B 10/112* | (2013.01) |
| *H04B 10/60* | (2013.01) |
| *H04B 10/50* | (2013.01) |
| *H04B 10/40* | (2013.01) |
| *H04B 10/114* | (2013.01) |

(52) U.S. Cl.
CPC ......... *H04B 10/1123* (2013.01); *H04B 10/11* (2013.01); *H04B 10/1143* (2013.01); *H04B 10/40* (2013.01); *H04B 10/50* (2013.01); *H04B 10/60* (2013.01)

(58) Field of Classification Search
CPC .... H04B 10/1123; H04B 10/11; H04B 10/40; H04B 10/50; H04B 10/60; H04B 10/1143
USPC .................. 398/118–131, 135–139, 182–214
See application file for complete search history.

(56) References Cited

U.S. PATENT DOCUMENTS

| | | | |
|---|---|---|---|
| 5,793,880 A * | 8/1998 | Constant | H04N 21/2383 398/118 |
| 6,795,655 B1 | 9/2004 | Sidorovich et al. | |
| 6,798,445 B1 * | 9/2004 | Brumitt | H04N 23/66 348/211.8 |
| 6,934,477 B2 | 8/2005 | Willebrand | |
| 8,135,281 B2 | 3/2012 | Zhovnirovsky et al. | |
| 8,254,785 B1 * | 8/2012 | Bushman | H04M 1/72433 398/118 |
| 8,494,218 B2 * | 7/2013 | Chen | G06V 10/141 348/113 |
| 9,391,701 B2 * | 7/2016 | Zeamari | H04B 10/1143 |
| 9,654,222 B1 * | 5/2017 | Shatz | G06T 19/006 |
| 10,411,812 B1 * | 9/2019 | Rose | H04B 10/1141 |
| 11,038,594 B1 * | 6/2021 | Claycomb | H01R 13/035 |

(Continued)

OTHER PUBLICATIONS

Zhang, Optical Cables on Fiberstore, Jul. 2018, All Document. (Year: 2018).*

*Primary Examiner* — Dibson J Sanchez
(74) *Attorney, Agent, or Firm* — Fish & Richardson P.C.

(57) ABSTRACT

In an example method, a first computer system accesses, via a first communication network, data for transmission to a second computer system, generates an optical representation of the data, and presents the optical representation of the data to the second computer system via a free space communications link. Further, the second computer system receives the optical representation of the data from the first computer system via the free space communications link, determines the data based on the optical representation of the data, and transmits the data to one or more additional computer systems via a second communications network.

20 Claims, 9 Drawing Sheets

(56) References Cited

U.S. PATENT DOCUMENTS

| | | | |
|---|---|---|---|
| 2002/0154137 A1* | 10/2002 | Ben-David | H04B 10/1141 345/596 |
| 2005/0254714 A1* | 11/2005 | Anne | H04B 10/116 382/233 |
| 2010/0034540 A1* | 2/2010 | Togashi | H04N 7/22 398/118 |
| 2010/0172651 A1* | 7/2010 | Nien | H04B 10/1141 398/135 |
| 2010/0284611 A1* | 11/2010 | Lee | G06V 20/63 348/222.1 |
| 2011/0007171 A1* | 1/2011 | Okumura | G06T 1/0085 348/E5.009 |
| 2011/0303826 A1* | 12/2011 | Liou | H05B 47/195 250/208.2 |
| 2013/0013932 A1* | 1/2013 | Kong | G06F 21/629 713/189 |
| 2015/0055866 A1* | 2/2015 | Cummins | G06V 30/153 382/176 |
| 2015/0349881 A1* | 12/2015 | Byers | H04B 10/07955 398/118 |
| 2017/0032190 A1* | 2/2017 | Sato | G06V 20/41 |
| 2017/0124368 A1* | 5/2017 | Jang | G06K 7/1413 |
| 2017/0132809 A1* | 5/2017 | Hiroki | G09G 5/02 |
| 2020/0336210 A1* | 10/2020 | Khatibzadeh | H04B 10/501 |
| 2021/0050917 A1* | 2/2021 | Ohta | H04B 10/516 |
| 2021/0194580 A1* | 6/2021 | Das | G06V 30/142 |
| 2022/0060258 A1* | 2/2022 | Sasaki | H04B 10/116 |

* cited by examiner

SYSTEMS AND METHODS FOR SECURELY EXCHANGING DATA BETWEEN COMPUTER SYSTEMS USING FREE SPACE OPTICAL COMMUNICATIONS

TECHNICAL FIELD

The disclosure relates to systems and methods for securely exchanging data between computer systems using free space optical communications.

BACKGROUND

Computer systems can exchange with one another via one or more communications networks. As an example, a first computer system can be communicatively coupled to a second computer system via one or more wired networks and/or wireless networks. Further, the first computer system can transmit data to the second computer system via those networks, and receive data from the second computer system via those networks.

SUMMARY

In general, computer systems may be subject to different network security restrictions, such as those established by an administrator of the computer systems. Further, a first computer system that is subject to high network security restrictions can be physically isolated from one or more second computer systems to protect against unauthorized access by malicious users. In some implementations, this physical isolation may be referred to as an "air gap."

In some implementations, computer systems can securely communicate one another via across an air gap using the free space optical communications systems and techniques described in this disclosure. As an example, a first computer system can identify data for transmission to the second computer system, generate an optical representation of the data, and project the optical representation to the second computer system across an air gap extending between them. For instance, if the data includes textual information, the first computer system can generate images that include an optical representation of the textual information, and project the images towards the second computer system. The second computer system can detect the projected optical representation (for example, using one or more optical sensors), determine the data based on the detected optical representation, and process the data accordingly.

The implementations described in this disclosure can provide various technical benefits. For instance, the systems and methods described in this disclosure enable computer systems to exchange data across an air gap in a secure manner. As an example, computer systems can exchange data one another through the transmission of optical representations of data, rather than through the transmission of Internet Protocol (IP) packets. Accordingly, the computer systems are not susceptible to attacks by malicious users that rely on vulnerabilities or other attack vectors in Internet Protocol (IP) based network communications. Thus, computer systems can be operated in a more secure manner, which can reduce the expenditure of computer resources in protecting against unauthorized access to the computer systems by malicious users and/or reversing damage to the computer system caused by malicious users.

In an aspect, a method includes: accessing, by a first computer system via a first communication network, data for transmission to a second computer system; generating, by the first computer system, an optical representation of the data; presenting, by the first computer system, the optical representation of the data to the second computer system via a free space communications link; receiving, by the second computer system, the optical representation of the data from the first computer system via the free space communications link; determining, by the second computer system, the data based on the optical representation of the data; and transmitting, by the second computer system, the data to one or more additional computer systems via a second communications network.

Implementations of this aspect can include one or more of the following features.

In some implementations, the free space communications link can include a line of sight optical link between a data transmit node of the first computer system and a data receive node of the second computer system.

In some implementations, at least a portion of the data transmit node, at least a portion of the data receive node, and at least a portion of at least one of the air gap or the vacuum gap can be enclosed in an enclosure. Further, the line of sight optical link can extend within the enclosure.

In some implementations, the line of sight optical link can extend across at least one of an air gap or a vacuum gap between the data transmit node of the first computer system and the data receive node of the second computer system.

In some implementations, generating the optical representation of the data can include generating one or more images representing the data.

In some implementations, presenting the optical representation of the data to the second computer system via the free space communications link can include presenting, by the first computer system, the one or more images to the second computer system using one or more display devices.

In some implementations, the data can include textual information, and the one or more images can include an optical representation of the textual information.

In some implementations, receiving the optical representation of the data from the first computer system via the free space communications link can include obtaining, by the second computer system, optical sensor data regarding the one or more images.

In some implementations, determining the data based on the optical representation of the data can include determining, by the second computer system, contents of the one or more images based on the optical sensor data; and determining, by the second computer system, the data based on the contents of the one or more images.

In some implementations, determining the data based on the contents of the one or more images can include generating one or more files based on the contents of the one or more images.

In some implementations, transmitting the data to one or more additional computer systems via the second communications network can include transmitting the one or more files to the one or more additional computer systems via the second communications network.

In some implementations, transmitting the one or more files to the one or more additional computer systems via the second communications network can include transmitting the one or more files to a storage area network (SAN) implemented by the one or more additional computer systems.

In some implementations, accessing data for transmission to the second computer system can include receiving, by the first computer system, a plurality of files; and aggregating, by the first computer system, contents of the files to determine the data for transmission to the second computer system.

In some implementations, the first communications network can be associated with a first set of network security restrictions, and the second communications network can be associated with a second set of network security restrictions different from the first set of network security requirements.

In some implementations, the second set of security restrictions can be greater than the first set of security restrictions.

In some implementations, there can be an absence of wired communications links communicatively coupling the first computer system and the second computer system.

In some implementations, there can be an absence of wireless radio communications links coupling the first computer system and the second computer system.

In some implementations, there can be an absence of Internet Protocol (IP) communications links coupling the first computer system and the second computer system.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1:
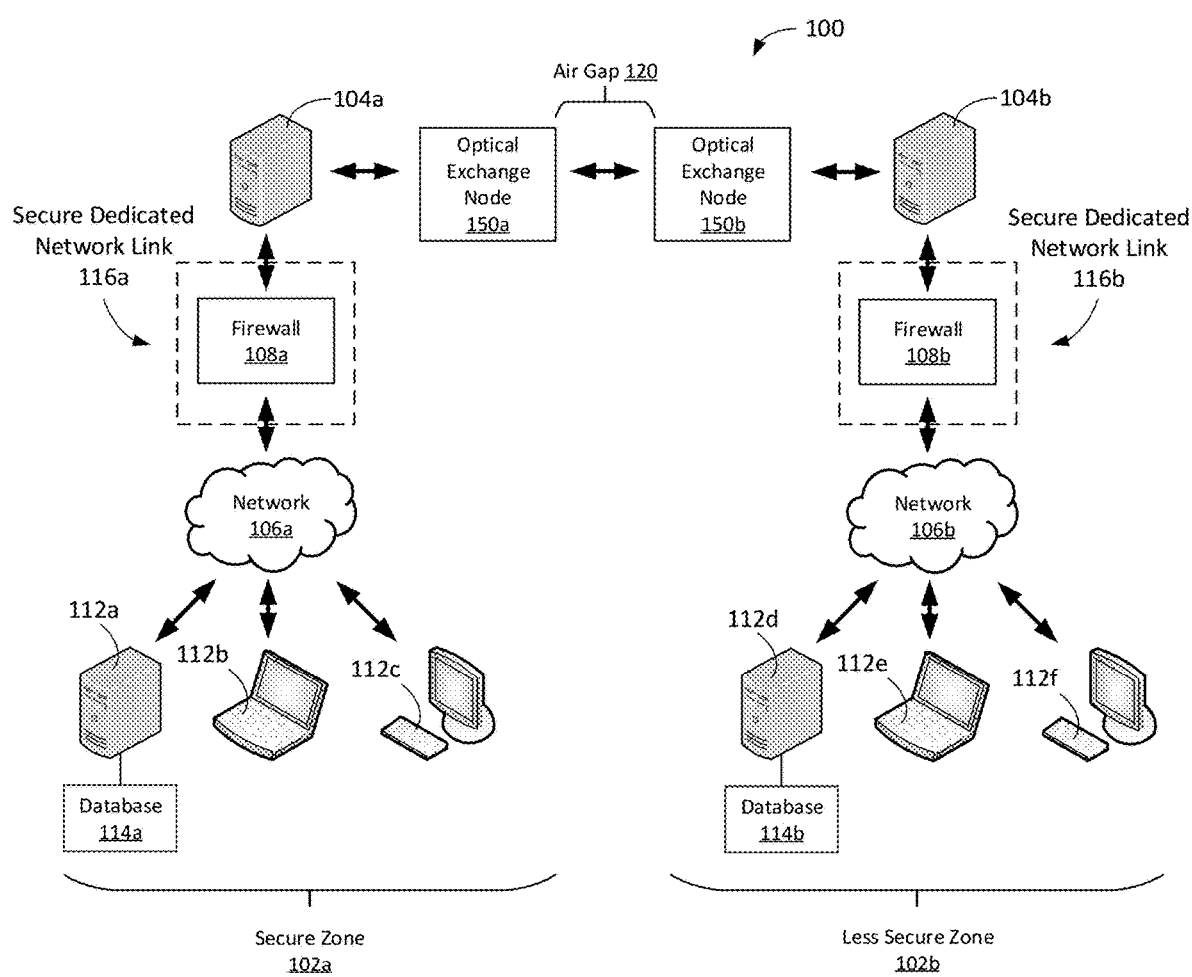
FIG. 1 is a diagram of an example system for exchanging data between computer systems in a secure manner.

In general, computer systems may be subject to different network security restrictions, such as those established by an administrator of the computer systems. As an example, a first computer system that is used to process and store sensitive data may be subject to high network security restrictions, such that data is protected from malicious users. As another example, a second computer system that is not used to process and store sensitive data may be subject to lower network security restrictions (for example, compared to those of the first computer system), such that users can access and use the second computer system more freely and/or more conveniently.

In some implementations, a first computer system that is subject to high network security restrictions can be physically isolated from one or more second computer systems to protect against unauthorized access by malicious users. As an example, the first computer system can be configured such that no wired communications links or wireless communications links (for example, network links established using radio frequency signals, such as Wi-Fi or Bluetooth) interconnect the first computer system and the one or more second computer systems. In some implementations, this physical isolation may be referred to as an "air gap."

Further, computer systems can securely communicate one another via across an air gap using the free space optical communications systems and techniques described in this disclosure. In an example implementation, a first computer system is physically isolated from a second computer system, such that no wired communications links or wireless communications links extend between them. Further, a first computer system can identify data for transmission to the second computer system, generate an optical representation of the data, and project the optical representation to the second computer system across the air gap between the first and second computer systems. As an example, if the data includes textual information, the first computer system can generate images that include an optical representation of the textual information, and project the images towards the second computer system. The second computer system can detect the projected optical representation (for example, using one or more optical sensors), determine the data based on the detected optical representation, and process the data accordingly.

In some implementations, the systems and methods described in this disclosure enable computer systems to exchange data across an air gap in a secure manner. For example, computer systems can exchange data one another through the transmission of optical representations of data, rather than through the transmission of Internet Protocol (IP) packets. Accordingly, the computer systems are not susceptible to attacks by malicious users that rely on vulnerabilities or other attack vectors in IP-based network communications. Thus, computer systems can be operated in a more secure manner (for example, compared to computer systems that exchange data using IP-based network communications).

FIG. 1 shows an example system 100 for exchanging, storing, and processing data. The system 100 is logically divided into two network zones 102a and 102b. Each of the network zones 102a and 102b has a different respective set of network security restrictions that controls access and use of the zone by users of the system 100.

In this example, the secure zone 102a of the system 100 is subject to a set of network security restrictions that is more restrictive than the set of network security requirements of the less secure zone 102b.

As an example, the secure zone 102a can be configured such that a first set of users can access the secure zone 102a. Further, the less secure zone 102b can be configured such that a second set of users can access the less secure zone 102b, where the first set of users is smaller than the second set of users. For instance, the first set of users can be a limited group of privileged users (for example, users having a restricted security clearance), whereas the second set of users can additionally include general users (for example, users not having a restricted security clearance).

As another example, the secure zone 102a can be configured such that the secure zone 102a can transmit data only to a first set of computer systems. Further, the less secure zone 102b can be configured such that the less secure zone 102b can transmit data only to a second set of computer systems, where the first set of computer systems is smaller than the second set of computer system. For instance, the first set of computer systems can be a limited group of computer systems (for example, computer systems operated by users having a restricted security clearance), whereas the second set of computer systems can additionally include general computer systems (for example, computer systems operated by users not having a restricted security clearance).

As another example, the secure zone 102a can be configured such that the secure zone 102a can receive data only from a first set of computer systems. Further, the less secure zone 102b can be configured such that the less secure zone 102b can receive data only from a second set of computer systems, where the first set of computer systems is smaller than the second set of computer system. For instance, the first set of computer systems can be a limited group of computer systems (for example, computer systems operated by users having a restricted security clearance), whereas the second set of computer systems can additionally include general computer systems (for example, computer systems operated by users not having a restricted security clearance).

Other sets of network security restrictions are only possible, either instead of or in addition to those described above.

Further, each of the network zones 102a and 102b has several components for exchanging, storing, and processing data.

As an example, the secure zone 102a includes a server system 104a communicatively coupled to a network 106a via a firewall 108a (for example, a network security system that monitors and controls incoming and outgoing network traffic based on security rules). Further, the secure zone 102a includes several additional computer systems 112a-112c communicatively coupled to the network 106a.

Further, the less secure zone 102b includes a server system 104b communicatively coupled to a network 106b via a firewall 108b. Further, the less secure zone 102b includes several additional computer systems 112d-112e communicatively coupled to the network 106b.

During an example operation of the system 100, each of the computer systems 112a-112c exchange data with one another, process data, and/or store data to perform computer-related tasks. As an example, each of the computer systems 112a-112c can exchange data with another via the network 106a. As another example, each of the computer systems 112a-112c can process data according to one or more computer operations of functions (for example, to transform or modify the data to achieve a particular result). As another example, each of the computer systems 112a-112c can store data, such as locally on that computer system 112a-112c or remotely using a remote database maintained on another computer system (for example, the database 114a maintained on the computer system 112a).

Further, during an example operation of the system 100, each of the computer systems 112d-112e exchange data with one another, process data, and/or store data to perform computer-related tasks. As an example, each of the computer systems 112d-112e can exchange data with another via the network 106b. As another example, each of the computer systems 112d-112e can process data according to one or more computer operations of functions (for example, to transform or modify the data to achieve a particular result). As another example, each of the computer systems 112d-112e can store data, such as locally on that computer system 112d-112e or remotely using a remote database maintained on another computer system (for example, the database 114b maintained on the computer system 112d).

Each of the computer systems 112a-112e can include any number of electronic device that are configured to receive, process, and transmit data. Examples of the computer systems 112a-112e include client computing devices (such as desktop computers or notebook computers), server computing devices (such as server computers or cloud computing systems), mobile computing devices (such as cellular phones, smartphones, tablets, personal data assistants, notebook computers with networking capability), wearable computing devices (such as a smart phone or a headset), and other computing devices capable of receiving, processing, and transmitting data. In some implementations, the computer systems 112a-112e can include computing devices that operate using one or more operating systems (as examples, Microsoft Windows, Apple macOS, Linux, Unix, Google Android, and Apple iOS, among others) and one or more architectures (as examples, x86, PowerPC, and ARM, among others). In some implementations, one or more of the computer system 112a-112e need not be located locally with respect to the rest of the system 100, and one or more of the computer systems 112a-112e can be located in one or more remote physical locations.

In FIG. 1, the computer systems 112a-112e are illustrated as respective single components. However, in practice, the computer systems 112a-112e can be implemented on one or more computing devices (for example, each computing device including at least one processor such as a microprocessor or microcontroller). As an example, the computer system 112a can be a single computing device that is connected to the network 106a, and the database 114a can be maintained and operated on the single computing device. As another example, the computer system 112a can include multiple computing devices that are connected to the network 106a, and the database 114a can be maintained and operated on some or all of the computing devices. For instance, the computer system 112a can include several computing devices, and the database 114a can be distributive on two or more of these computing devices (for example, to implement a storage area network (SAN)).

The network 106a can be any communications network through which data can be transferred and shared. For example, the network 106a can be a local area network (LAN). The network 106a can be implemented using various networking interfaces, for instance wireless networking interfaces (such as Wi-Fi, Bluetooth, or infrared) or wired networking interfaces (such as Ethernet or serial connection). The network 106a also can include combinations of more than one network, and can be implemented using one or more networking interfaces. In some implementations, the network 106a can provide IP-based communications between computer systems.

Further, the network 106b also can be any communications network through which data can be transferred and shared. For example, the network 106b can be a local area network (LAN) or a wide-area network (WAN), such as the Internet. The network 106b can be implemented using various networking interfaces, for instance wireless networking interfaces (such as Wi-Fi, Bluetooth, or infrared) or wired networking interfaces (such as Ethernet or serial connection). The network 106b also can include combinations of more than one network, and can be implemented using one or more networking interfaces. In some implementations, the network 106b can provide IP-based communications between computer systems.

In this example, the secure zone 102a and the less secure zone 102b are physically isolated from another by an air gap 120. In general, the air gap 120 can be a region of free space, such as air and/or vacuum. In practice, the width of the air gap 120 can vary, depending on the implementation. As an example, the air gap 120 can have a width of 1 inch, 2 inches, 3 inches, or some other distance. As an example, the air gap 120 can have a width of 1 foot, 2 feet, 3 feet, or some other distance. As another example, the air gap 120 can have width of 1 mile, 2 miles, 3 miles, or some other distance.

Further, the system 100 is configured such that there is an absence of wired communications links and wireless communications links interconnecting the secure zone 102a and the less secure zone 102b. For example, there may be absence of Ethernet cabling, fiber optic cabling, or any other wired interconnections between the secure zone 102a and the less secure zone 102b. As another example, there may be an absence of Wi-Fi links, Bluetooth links, or other any interconnections established using radio frequency signals between the secure zone 102a and the less secure zone 102b.

The secure zone 102a and the less secure zone 102b can securely exchange data with one another across the air gap 120 using optical exchange nodes 150a and 150b.

As an example, the server computer 104a can receive data for transmission to the less secure zone 102b, such as from one or more of the computer systems 112a-112c via the network 106a and the firewall 108a. In some implementations, the server computer 104a can receive data over a secure dedicated network link 116a between the network 106a and the server computer 104a. As an example, the secure dedicated network link 116a can include one or more optical communications channels, such as optical channels implemented using time division multiplexing (TDM), synchronous digital hierarchy (SDH), synchronous optical network (SONET), wave division multiplexing (WDM), dedicated fiber strands, and/or dedicated cabling. In some implemented, the dedicated secure network link 116a can be implemented using non-public, private IP connection.

Further, the firewall 108a can regulate the transmission of data across the secure dedicated network link 116a based on security rules. For example, the firewall 108a can be configured to selectively enable certain types of data to be transmitted and to enable data to be transmitted according to certain protocols. Further, the firewall 108a can be configured to selectively prevent other types of data to be transmitted and to prevent data from being transmitted according to other protocols.

Further, the server computer 104a can provide the data to the optical exchange node 150a for transmission. The optical exchange node 150a generates an optical representation of the data (for example, one or more images representing the data), and projects the optical representation of the data towards the optical exchange node 150b. The optical exchange node 150b detects the projected optical representation (for example, using one or more optical sensors), determines the data based on the detected optical representation, and provides the data to the server computer 104b. The server computer 104b routes the data to the intended destination (for example, one or more of the computer system 112d-112f via the firewall 108b and the network 106b). Accordingly, data can be transmitted from the secure zone 102a to the less secure zone 102b without using any wireless communications links or wireless communications links (for example, communications links established using radio frequency signals).

As another example, the server computer 104b can receive data for transmission to the secure zone 102a, such as from one or more of the computer systems 112d-112f via the network 106b and the firewall 108b. In some implementations, the server computer 104b can receive data over a secure dedicated network link 116b between the network 106b and the server computer 104b. As an example, the secure dedicated network link 116b can include one or more optical communications channels, such as optical channels implemented using TDM, SDH, SONET, WDM, dedicated fiber strands, and/or dedicated cabling. In some implemented, the secure dedicated network link 116b can be implemented using non-public, private IP connection.

Further, the firewall 108b can regulate the transmission of data across the secure dedicated network link 116b based on security rules. For example, the firewall 108b can be configured to selectively enable certain types of data to be transmitted and to enable data to be transmitted according to certain protocols. Further, the firewall 108b can be configured to selectively prevent other types of data to be transmitted and to prevent data from being transmitted according to other protocols.

Further, the server computer 104b can provide the data to the optical exchange node 150b for transmission. The optical exchange node 150b generates an optical representation of the data (for example, one or more images representing the data), and projects the optical representation of the data towards the optical exchange node 150a. The optical exchange node 150a detects the projected optical representation (for example, using one or more optical sensors), determines the data based on the detected optical representation, and provides the data to the server computer 104a. The server computer 104a routes the data to the intended destination (for example, one or more of the computer system 112a-112cc via the firewall 108a and the network 106a). Accordingly, data can be transmitted from the less secure zone 102b to the secure zone 102a without using any wireless communications links or wireless communications links (for example, communications links established using radio frequency signals).

Figure 2A:
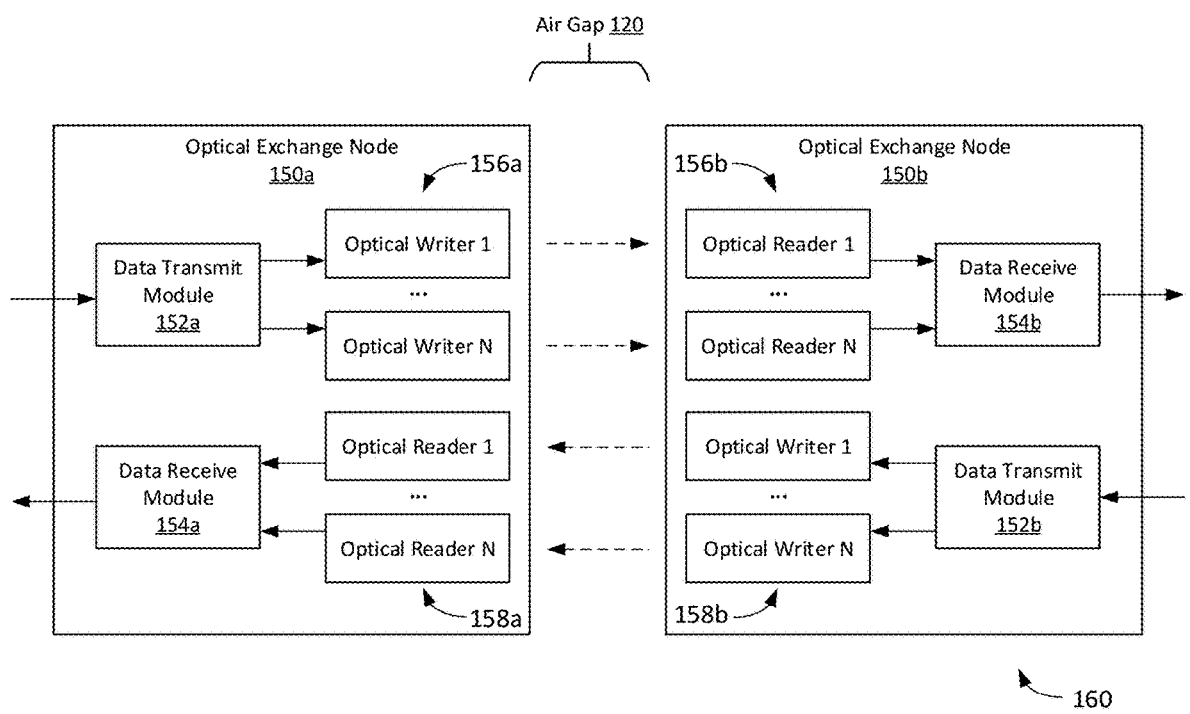
FIGS. 2A-2C are diagrams of example optical exchange nodes.

The optical exchange nodes 150a and 150b are shown in greater detail in FIG. 2A.

The optical exchange nodes 152a and 152b include data transmit modules 152a and 152b, respectively, and data receive modules 154a and 154b, respectively. Further, the data transmit modules 152a and 152b are communicatively coupled to sets of optical writers 156a and 156b, respectively. Further, the data receive modules 154a and 154b are communicatively coupled to sets of optical readers 158a and 158b, respectively.

During an example operation of the optical exchange nodes 150a and 150b, the data transmit module 152a receives data from the secure zone 102a for transmission to the less secure zone 102b, and generates an optical representation of that data. As an example, the data transmit module 152a can receive one or more files from the server computer 104a, each file containing textual information. Further, the data transmit module 152a can generate one or more images representing the textual information. For instance, each of the images can include pixels having a particular pattern of colors and/or intensities that visually depict at least at portion of the textual information.

Further, the data transmit module 152a projects the optical representation of the data to the optical exchange node 150b across the air gap 120. As an example, the data transmit module 152a can provide one or more of the generated images to the optical writers 156a, and instruct the optical writers 156a to project the generated images to corresponding optical readers 156b of the optical exchange node 150b. In some implementations, images can be projected by projecting light according to particular temporal and/or spatial patterns (for example, to visually depict at least at portion of the data). In some implementations, projecting an image may be referred to as "replicating" an image (for example, replicating an image on each side of the air gap 120).

Each of the optical writers 156a can include one or more components for projecting images across the air gap 120. As an example, an optical writer 156a can include one or more display screens, such as liquid crystal displays (LCDs), light emitting diode LED) displays, or organic light emitting diode (OLED) displays. As another example, an optical writer 156a can include one or more optical projectors, such as LCD projectors, digital light processing (DLP) projectors, liquid crystal on silicon (LCoS) projectors, LED projectors, or laser projectors.

The optical readers 156b of the optical exchange node 150b detect the projected optical representations, and provide information regarding the detected optical representations to the data receive module 154b. As an example, the optical readers 156b can include one or more optical sensors or photodetectors that detect light projected by the optical writers 156a, and generate optical sensor data representing the detected light.

The optical readers 156b provide the optical sensor data to the data receive module 154b for interpretation. For example, based on the optical sensor data, the data receive module 154b can generate one or more images corresponding to the projected light (for example, images that are similar to or approximate the images that were generated by the data transmit module 152a). Further, data receive module 154b can extract the data represented in the images. For example, the data receive module 154b can identify textual information depicted in the images, and extract the textual information from the images (for example, using optical character recognition (OCR) techniques).

Further, the data receive module 154b can generate one or more files based on the extracted data. For example, the data receive module 154b can generate one or more files, each containing at least a portion of the data (for example, textual information) that was extracted from the images.

Further, the data receive module 154b provides the extracted data to the less secure zone 102b for storage and/or further processing. As an example, the data receive module 154b can provide one or more files to the server computer 104b. The server computer 104b can store at least some of the data for further retrieval, such as locally on the server computer 104b or remotely using the database 114b. Further, the server computer 104b can process at least some of the data (for example, to transform or modify the data to achieve a particular result). Further, the server computer 104b can transmit at least some of the data to one or more of the computer systems 112d-112f via the network 106b).

Similarly, the optical exchange nodes 150a and 150b can be used to transmit data from the less secure zone 102b to the secure zone 102a.

For example, during an example operation of the optical exchange nodes 150a and 150b, the data transmit module 152b receives data from the less secure zone 102b for transmission to the secure zone 102a, and generates an optical representation of that data. As an example, the data transmit module 152b can receive one or more files from the server computer 104b, each file containing textual information. Further, the data transmit module 152b can generate one or more images representing the textual information.

Further, the data transmit module 152b projects the optical representation of the data to the optical exchange node 150a across the air gap 120. As an example, the data transmit module 152a can provide one or more of the generated images to the optical writers 156b, and instruct the optical writers 156b to project the generated images to corresponding optical readers 156a of the optical exchange node 150a. In some implementations, images can be projected by projecting light according to particular temporal and/or spatial patterns. In some implementations, projecting an image may be referred to as "replicating" an image (for example, replicating an image on each side of the air gap 120).

In general, the optical writers 156b can be similar to the optical writers 156a. For example, each of the optical writers 156b can include one or more components for projecting images across the air gap 120. As an example, an optical writer 156b can include one or more display screens, such as LCDs, LED displays, or OLED displays. As another example, an optical writer 156b can include one or more optical projectors, such as LCD projectors, DLP projectors, LCoS projectors, LED projectors, or laser projectors.

The optical readers 156a of the optical exchange node 150a detect the projected optical representations, and provide information regarding the detected optical representations to the data receive module 154a. As an example, the optical readers 156a can include one or more optical sensors or photodetectors that detect light projected by the optical writers 156b, and generate optical sensor data representing the detected light.

The optical readers 156a provide the optical sensor data to the data receive module 154a for interpretation. For example, based on the optical sensor data, the data receive module 154b can generate one or more images corresponding to the projected light (for example, images that are similar to or approximate the images that were generated by the data transmit module 152b). Further, data receive module 154a can extract the data represented in the images. For example, the data receive module 154a can identify textual information depicted in the images, and extract the textual information from the images (for example, using OCR techniques).

Figure 2B:
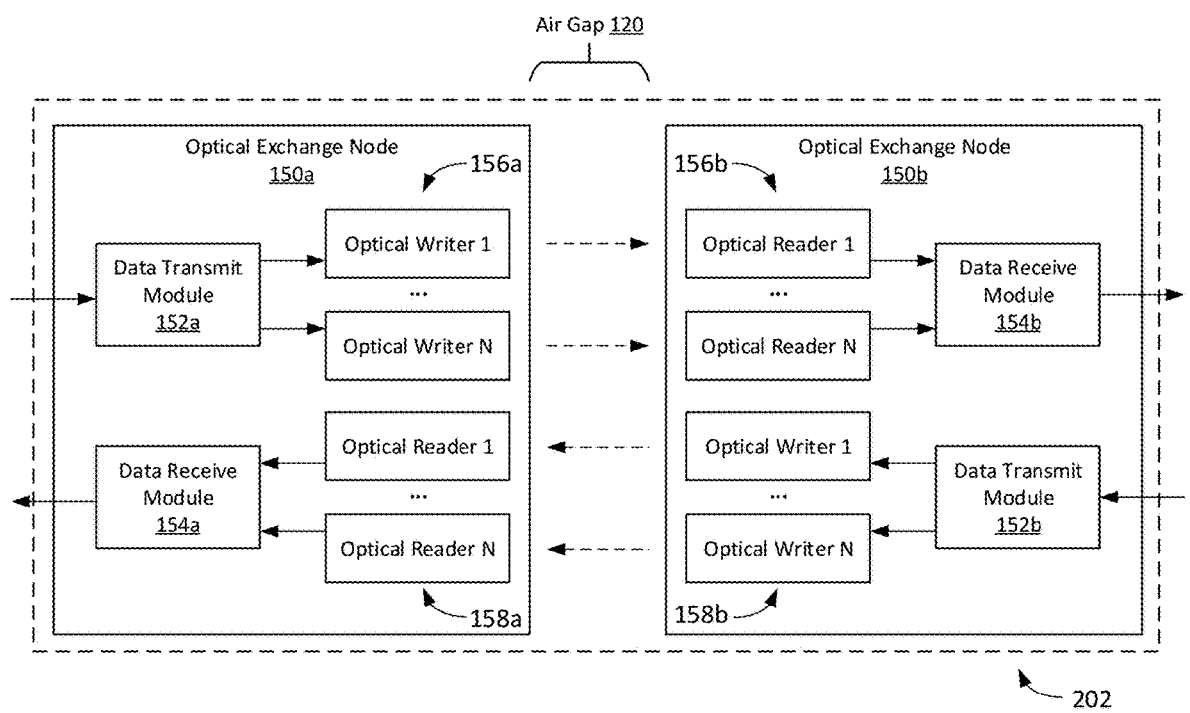

In some implementations, at least a portion of the optical exchange node 150a, at least a portion of the optical exchange node 150b, and at least a portion of the air gap 120 can be enclosed in a common enclosure or housing (for example, an enclosure or housing 202, as shown in FIG. 2B). Further, the optical exchange nodes 150a and 150b can exchange data by transmitting optical representations of data within the housing 202.

Figure 2C:
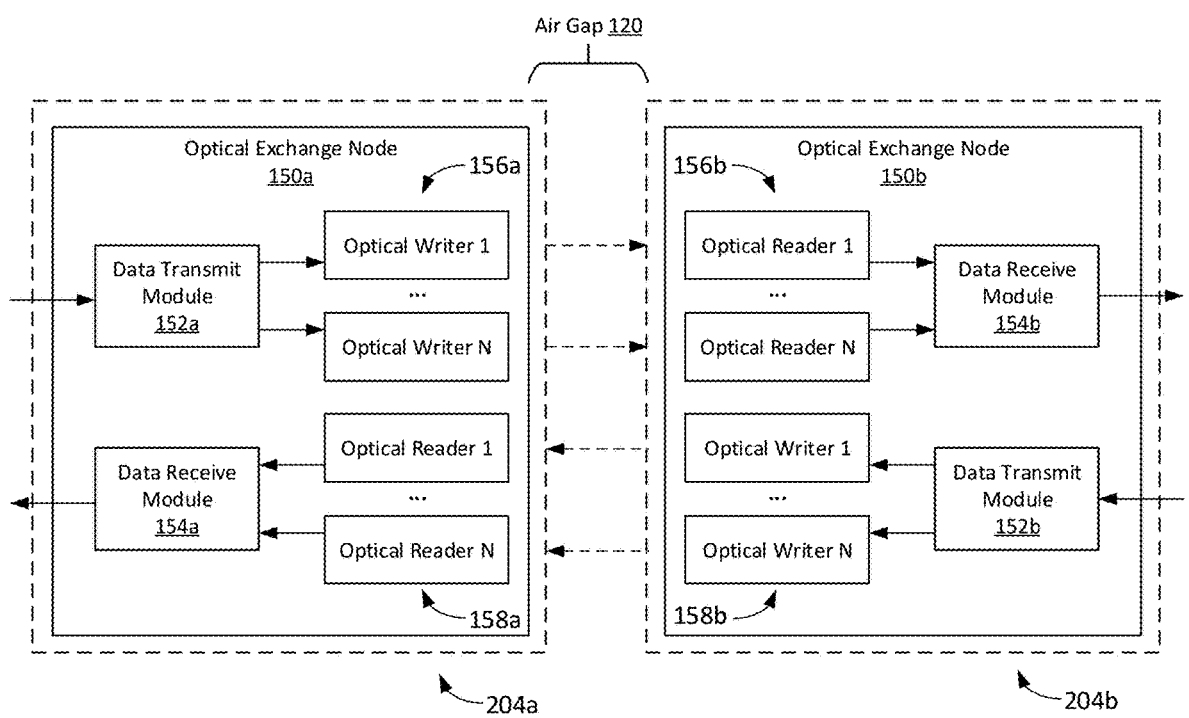

In some implementations, at least a portion of the optical exchange node 150a and at least a portion of the optical exchange node 150b can be enclosed in different respective enclosures or housings (for example, enclosures or housings 204a and 204b, respectively, as shown in FIG. 2C). Further, the optical exchange nodes 150a and 150b can exchange data by transmitting optical representations of data between the housings 204a and 204b.

Further, the data receive module 154a can generate one or more files based on the extracted data. For example, the data receive module 154a can generate one or more files, each containing at least a portion of the data (for example, textual information) that was extracted from the images.

Further, the data receive module 154a provides the extracted data to the secure zone 102a for storage and/or further processing. As an example, the data receive module 154a can provide one or more files to the server computer 104a. The server computer 104a can store at least some of the data for further retrieval, such as locally on the server computer 104a or remotely using the database 114a. Further, the server computer 104a can process at least some of the data. Further, the server computer 104a can transmit at least some of the data to one or more of the computer systems 112a-112c via the network 106a.

In some implementations, the system 100 can stage or buffer data for transmission between the secure zone 102a and the less secure zone 102b, generate optical representations of the staged or buffered data, and transmit the optical representations across the air gap 120. As an example, referring to FIG. 3A, the server computer 104*a* can receive data 300*a* from several data sources (for example, one or more of the computer systems 112*a*-112*c*) via the network 106*a*, the secure dedicated network link 116*a*, and the firewall 108*a*, and aggregate at least some of the data into one or more files. Further, the server computer 104*a* can instruct the optical exchange node 150*a* to generate one or more images representing the contents of the files, and project the images to the optical exchange node 150*b*.

Similarly, the server computer 104*b* can receive data 302*b* from several data source (for example, one or more of the computer systems 112*d*-112*f*) via the network 106*b*, the secure dedicated network link 116*b*, and the firewall 108*b*, and aggregate at least some of the data into one or more files. Further, the server computer 104*b* can instruct the optical exchange node 150*b* to generate one or more images representing the contents of the files, and project the images to the optical exchange node 150*a*.

In some implementations, at least some of the files can store data in a plain text format or binary format, without any structures for indexing or recognizing relationships between records. These files may be referred to as "flat files." In some implementations, relationships among the data in a flat file can be inferred from the data, but the format of the flat file itself may not make those relationships explicit.

Further, a server computer 104*a* or 104*b* can aggregate data according to a particular priority. As an example, a server computer 104*a* or 104*b* can aggregate data in the order that is received. For example, a server computer 104*a* or 104*b* can queue files based on a time stamp associated with each file, and sequentially process the files in the queue.

As another example, a server computer 104*a* or 104*b* can determine a priority that is associated with each portion of data, and queue the data for processing based on the priority. For instance, high priority portions of data can be ordered prior to low priority portions of data in the queue, such that high priority portions of data are aggregated into one or more files, prior to aggregating low priority portions of data into the files. In some implementations, the priority of a portion of data can be indicated in the portion of the data (for example, using one or more data flags or fields). In some implementations, the priority of a portion of data can be determined based on the source and/or destination of the portion of data. In some implementations, the priority of a portion of data can be determined based on the contents of the portion of data.

In some implementations, the server computers 104*a* and 104*b* can exchange data with one another according to a particular schedule. As an example, the server computers 104*a* and 104*b* can exchange data with one another according to a periodic time synchronization cycle. The period of the time synchronization cycle (for example, the time interval between data transmission) can be vary, depending on the implementation. For instance, the period of the time synchronization cycle can be user configurable in the order of seconds or minutes (for example, by an administrator of the system 100).

In some implementations, a server computer 104*a* or 104*b* can also verify data received across the air gap 120, prior to transmitting the data to one or more of the computer systems 112*a*-112*f*. As an example, a server computer 104*a* or 104*b* can extract data from images received by an optical exchange nodes 150*a* or 150*b*, and check the integrity of the extracted data (for example, based on checksums or using other error detection techniques). Upon verification of the data, the server computer 104*a* or 104*b* can transmit the data to one or more of the computer systems 112*a*-112*f*. However, if the data cannot be verified (for example, due to corruption during transmission), the server computer 104*a* or 104*b* can request that the data be retransmitted.

Figure 3A:
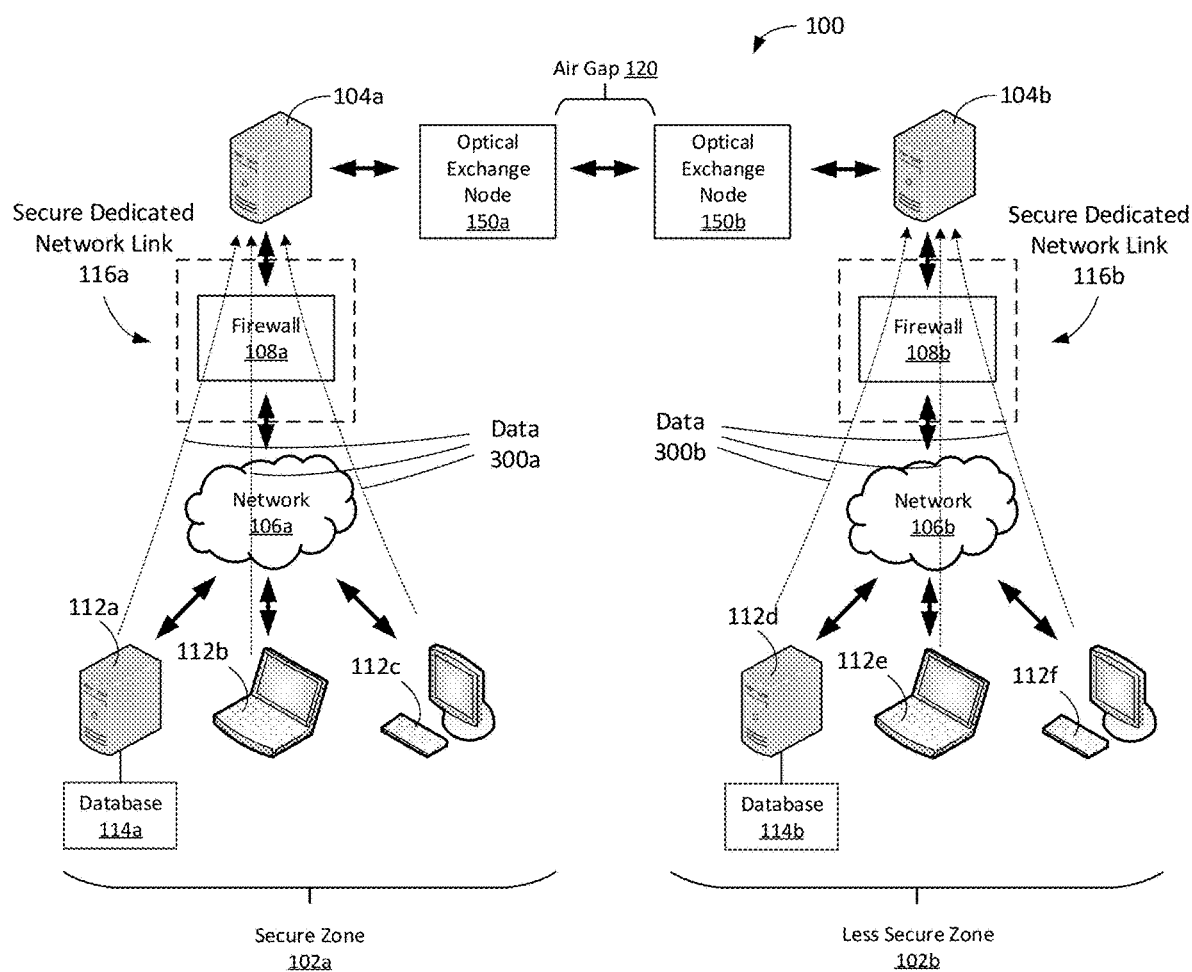
FIGS. 3A-3C are diagram of example operations performed by the system shown in FIG. 1 and the optical exchange nodes shown in FIG. 2.

In some implementations, the system 100 can selectively modify storage volumes based on the transmitted data. As an example, as shown in FIG. 3A, the databases 114*a* and 114*b* can be implemented as storage area networks (SANs) that store data in one or more storage volumes (for example, storage volumes 1 to N). Upon receiving data for storage on the database 114*a*, the server computer 104*a* can identify the storage volume(s) within which the data is to be stored, and cause the database 114*a* to selectively modify that storage volume(s) to include the data. Further, upon receiving data for storage on the database 114*b*, the server computer 104*ab* can identify the storage volume(s) within which the data is to be stored, and cause the database 114*b* to selectively modify that storage volume(s) to include the data.

Figure 3B:
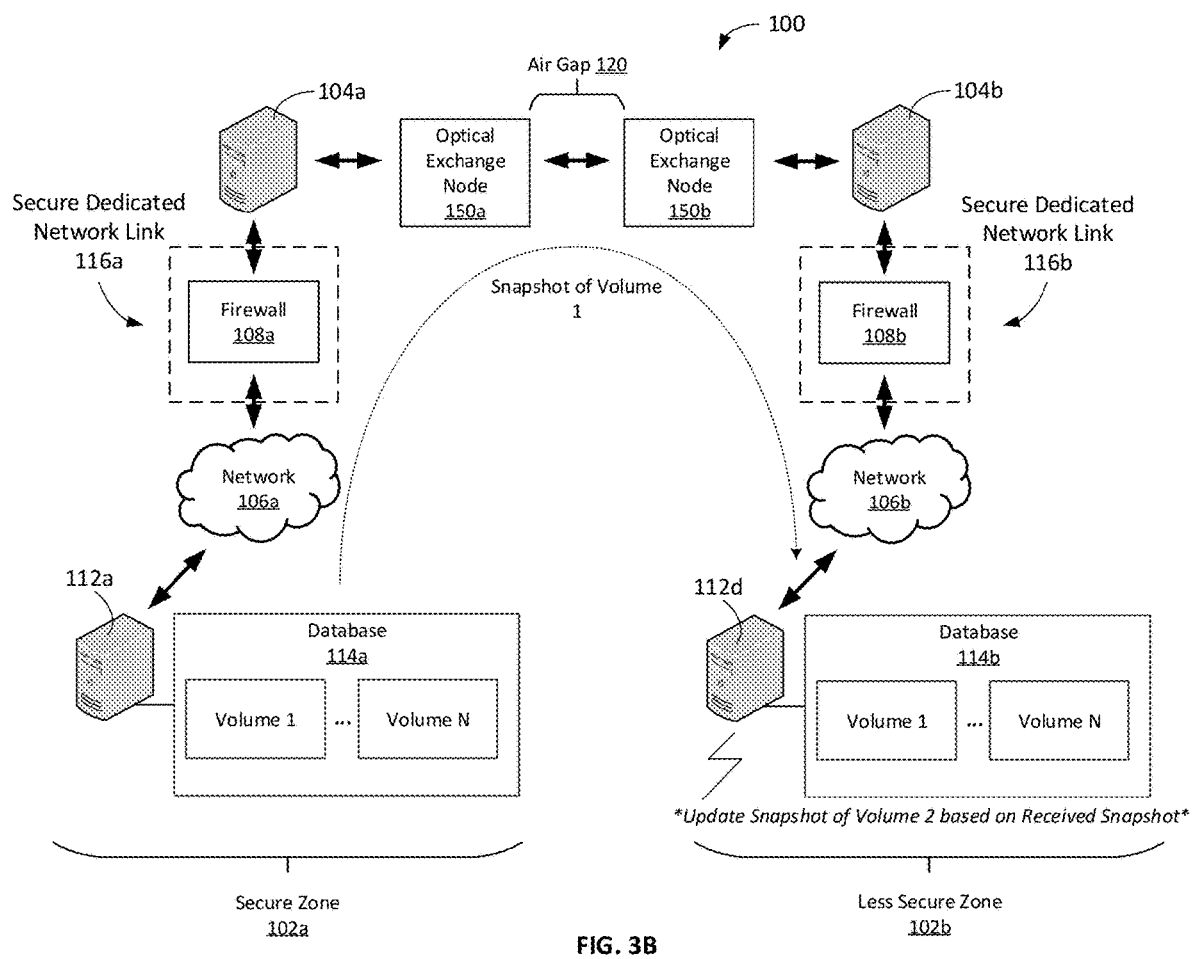

For example, referring to FIG. 3B, the computer system 112*a* can generate a snapshot of a storage volume "1" in the database 114*a*, and transmit data regarding the snapshot to the computer system 112*d* via the optical exchange nodes 150*a* and 150*b*. The computer system 112*d* determines that the snapshot corresponds to a storage volume "2" in the database 114*b*, and updates the snapshot of the storage volume "2" based on the received snapshot.

Figure 3C:
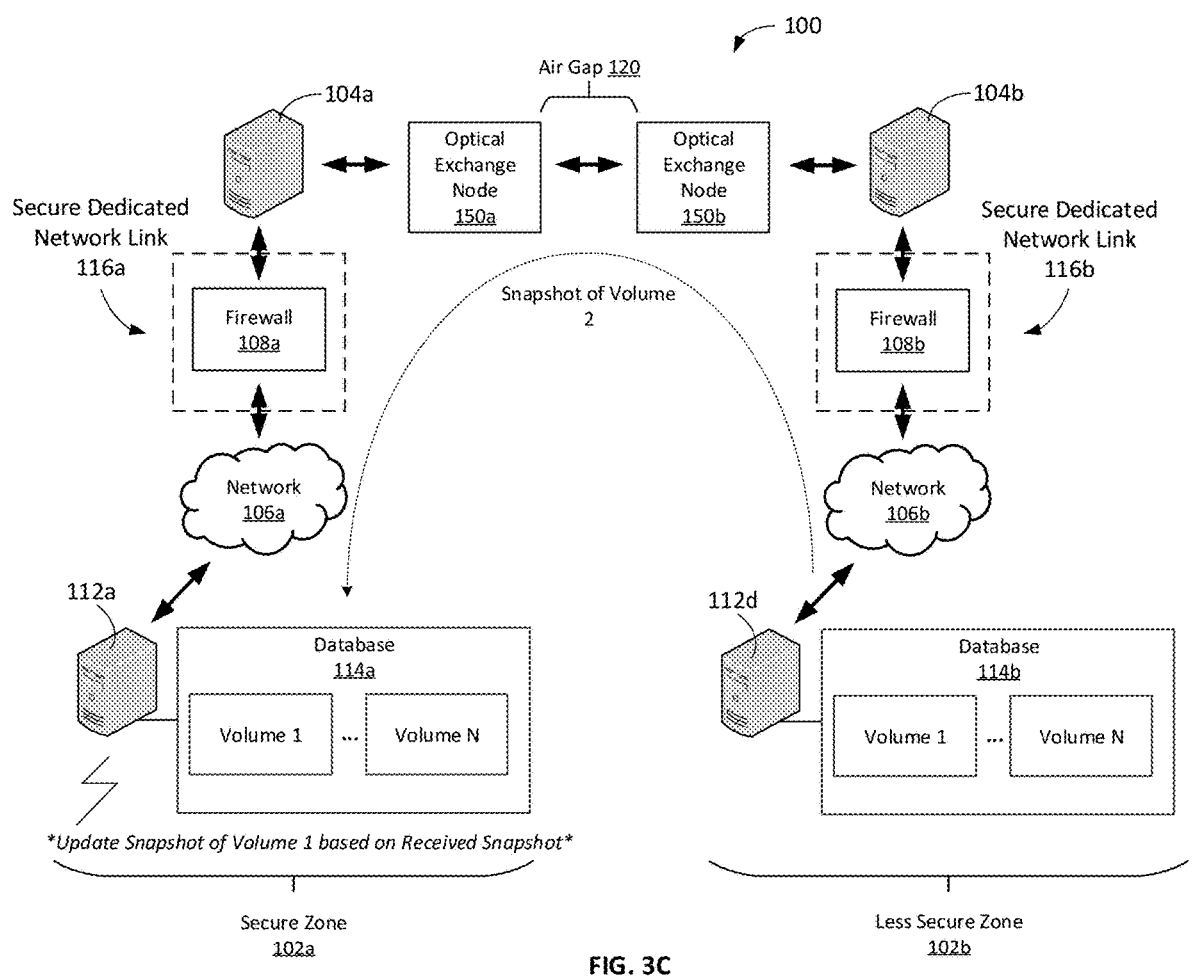

As another example, referring to FIG. 3C, the computer system 112*d* can generate a snapshot of a storage volume "2" in the database 114*b*, and transmit data regarding the snapshot to the computer system 112*a* via the optical exchange nodes 150*a* and 150*b*. The computer system 112*a* determines that the snapshot corresponds to a storage volume "2 in the database 114*a*, and updates the snapshot of the storage volume "1" based on the received snapshot.

Further, in some implementations, data can be transmitted between the optical exchange nodes 150*a* and 150*b* to synchronize data across the databases 114*a* and 114*b*. For example, the computer system 112*a* can generate a snapshot of a particular data volume of the database 114*a*, and provide the snapshot to the computer system 112*d* via the optical exchange nodes 150*a* and 150*b*. Further, the computer system 112*b* can determine differences between the received snapshot and a data volume stored on the database 114*b*, and update the database 114*b* based on the determined differences (for example, such that the data volume of the database 114*b* stores the same information as the storage volume of the database 114*a*).

Example Processes

Figure 4:
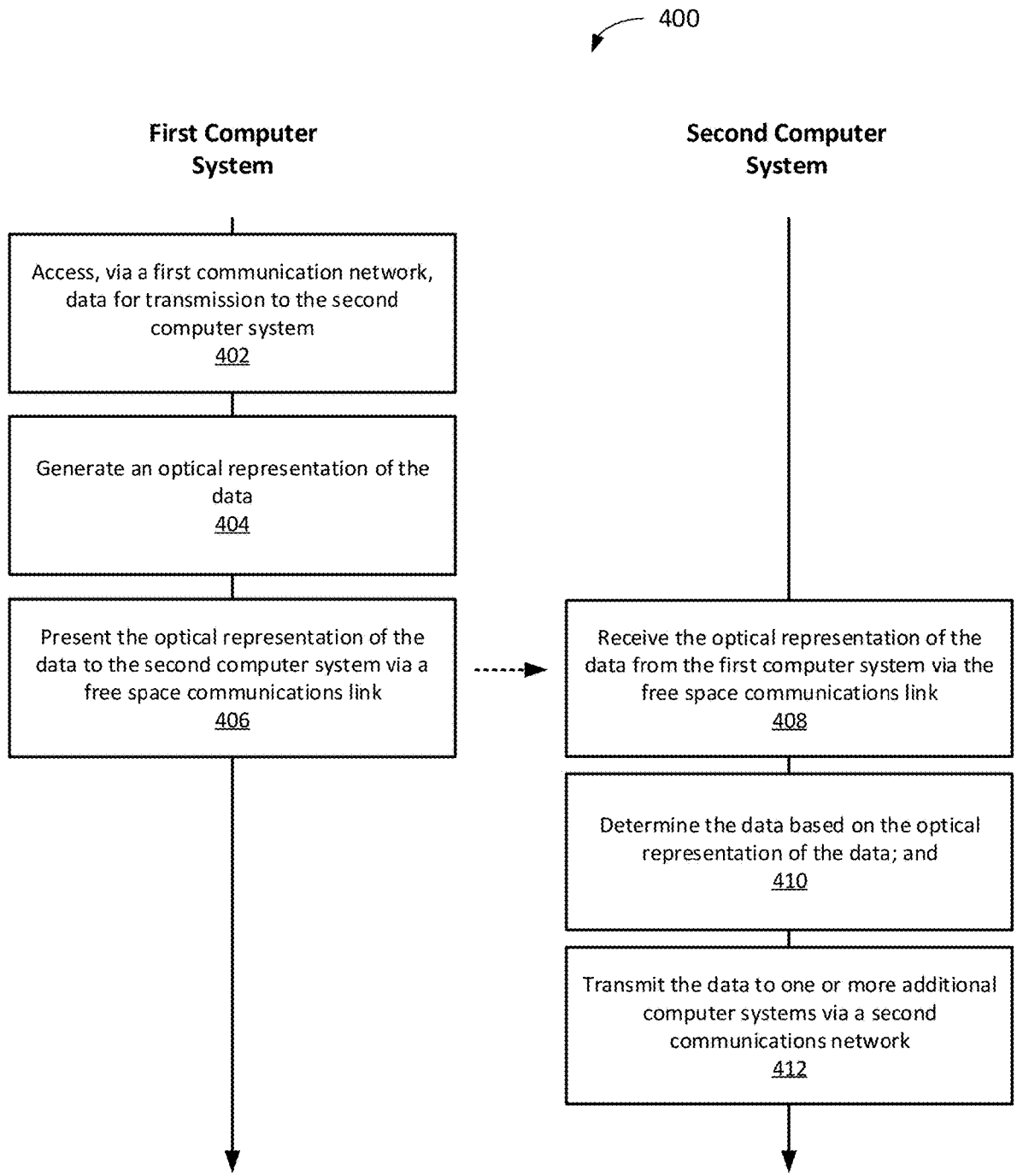
FIG. 4 is a flow chart diagrams of example processes for exchanging data between computer systems in a secure manner.

FIG. 4 shows an example process 400 for exchanging data between computer systems in a secure manner. In some implementations, the process 400 can be performed by the system 100 described in this disclosure (for example, as shown and described with reference to FIGS. 1 and 2A-2C).

In the process 400, a first computer system accesses, via a first communication network, data for transmission to a second computer system (block 402).

In some implementations, the first communications network can be associated with a first set of network security restrictions, and the second communications network can be associated with a second set of network security restrictions different from the first set of network security requirements. In some implementations, the second set of security restrictions can be greater (for example, more restrictive) than the first set of security restrictions. In some implementations, the first set of security restrictions can be greater (for example, more restrictive) than the second set of security restrictions.

As an example, the first computer system can include one or more components of the secure zone 102a, and the second computer system can include one or more components of the less secure zone 102b. As another example, the first computer system can include one or more components of the less secure zone 102b, and the second computer system can include one or more components of the secure zone 102a.

In some implementations, there is an absence of wired communications links and/or wireless radio communications links communicatively coupling the first computer system and the second computer system. Further, there may be an absence of Internet Protocol (IP) communications links coupling the first computer system and the second computer system.

In some implementations, the first computer system can determine the data for transmission to the second computer system, at least in part, by receiving a plurality of files (for example, from the first communication network), and aggregating the contents of the files.

Further, the first computer system generates an optical representation of the data (block 404). In some implementations, generating the optical representation of the data can include generating one or more images representing the data. As an example, the data can include textual information, and the one or more images can include an optical representation of the textual information.

Further, the first computer system presents the optical representation of the data to the second computer system via a free space communications link (block 406). In some implementations, presenting the optical representation of the data can include presenting the one or more images to the second computer system using one or more display devices. Example display devices include display screens and optical projectors.

In some implementations, the free space communications link can include a line of sight optical link between a data transmit node of the first computer system and a data receive node of the second computer system. Further, the line of sight optical link can extends across at least one of an air gap or a vacuum gap between the data transmit node of the first computer system and the data receive node of the second computer system. Data transmit nodes and data receive nodes can be implemented, for example, using the optical exchange nodes 150a and 150b described with reference to FIGS. 1 and 2A-2C.

In some implementations, at least a portion of the data transmit node, at least a portion of the data receive node, and at least a portion of at least one of the air gap or the vacuum gap can be enclosed in an enclosure (for example, as shown and described with reference to FIG. 2B). Further, the line of sight optical link can extend within the enclosure.

In some implementations, at least a portion of the data transmit node and at least a portion of the data receive node can be enclosed in different respective enclosures (for example, as shown and described with reference to FIG. 2C). Further, the line of sight optical link can extend between the enclosures.

The second computer system receives the optical representation of the data from the first computer system via the free space communications link (block 408). In some implementations, receiving the optical representation of the data can include obtaining optical sensor data regarding the one or more images. Optical sensor data can be obtained, for example, by one or more optical sensors or photodetectors.

Further, the second computer system determines the data based on the optical representation of the data (block 410). In some implementations, the data can be determined, at least in part, by determining contents of the one or more images based on the optical sensor data, and determining the data based on the contents of the one or more images. Further, the second computer system can generate one or more files based on the contents of the one or more images.

Further, the second computer system transmits the data to one or more additional computer systems via a second communications network (block 412). In some implementations, transmitting the data to one or more additional computer systems can include transmitting one or more files to the one or more additional computer systems via the second communications network. In some implementations, the one or more files can be transmitted to a storage area network (SAN) implemented by the one or more additional computer systems.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100, including the optical exchange nodes 150a and 150b, can be implemented using digital electronic circuitry, or in computer software, firmware, or hardware, or in combinations of one or more of them. In another example, the process 400 shown in FIG. 4 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 5:
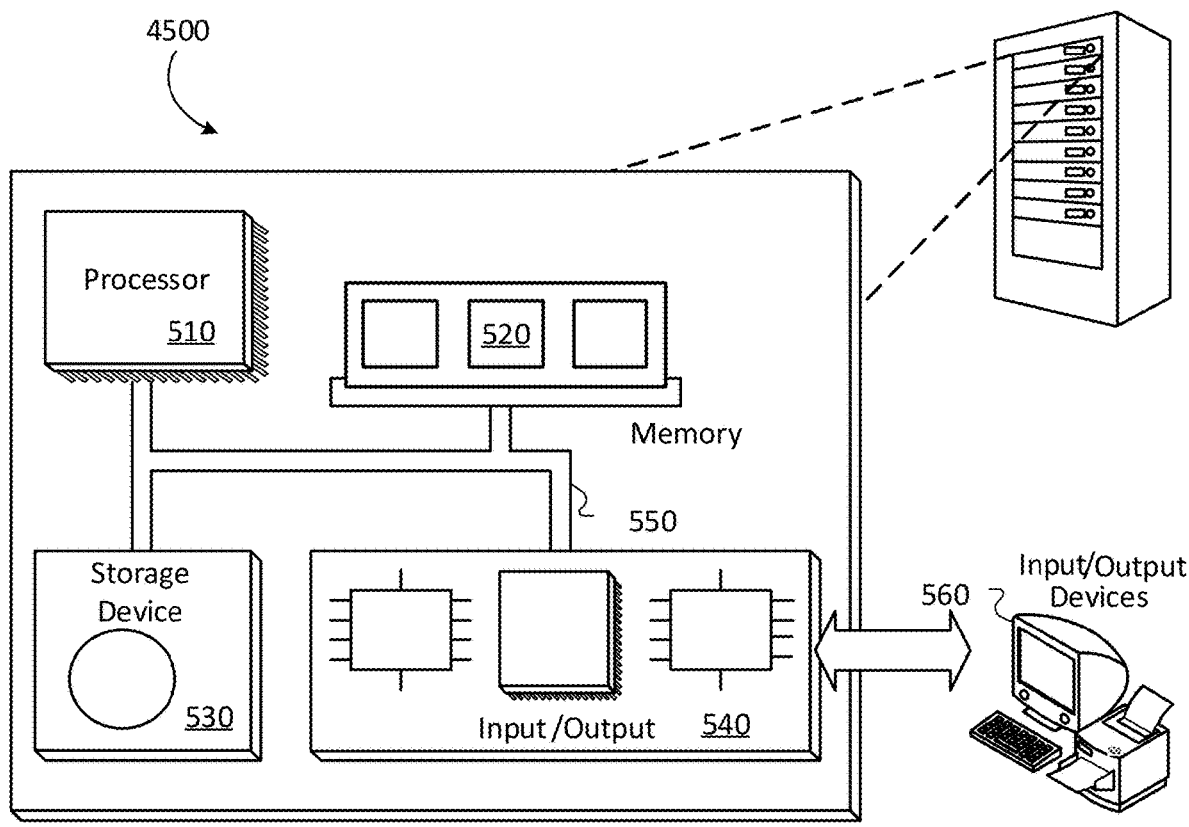
FIG. 5 is a schematic diagram of an example computer system.

FIG. 5 shows an example computer system 500 that includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:
1. A method comprising:
accessing, by a first computer system via a first communication network, data for transmission to a second computer system, wherein the data comprises textual information;
generating, by the first computer system, an optical representation of the data, wherein the optical representa- tion of the data comprises one or more images depicting the textual information;

presenting, by the first computer system using a plurality of optical writers, the optical representation of the data to the second computer system via a free space communications link;

receiving, by the second computer system using a plurality of optical readers, the optical representation of the data from the first computer system via the free space communications link, wherein each of the optical readers receives the optical representation of the data from a different respective one of the optical writers;

determining, by the second computer system, the data based on the optical representation of the data, wherein at least a portion of the data is determined based on optical character recognition of the one or more images; and transmitting, by the second computer system, the data to one or more additional computer systems via a second communications network.

2. The method of claim 1, wherein the free space communications link comprises a line of sight optical link between a data transmit node of the first computer system and a data receive node of the second computer system.

3. The method of claim 2, wherein the line of sight optical link extends across at least one of an air gap or a vacuum gap between the data transmit node of the first computer system and the data receive node of the second computer system.

4. The method of claim 3, wherein at least a portion of the data transmit node, at least a portion of the data receive node, and at least a portion of at least one of the air gap or the vacuum gap is enclosed in an enclosure, and
wherein the line of sight optical link extends within the enclosure.

5. The method of claim 1, wherein generating the optical representation of the data comprises:
generating one or more images representing the data.

6. The method of claim 5, wherein presenting the optical representation of the data to the second computer system via the free space communications link comprises:
presenting, by the first computer system, the one or more images to the second computer system using the optical writers.

7. The method of claim 6, wherein the data comprises textual information, and
wherein the one or more images comprise an optical representation of the textual information.

8. The method of claim 6, wherein receiving the optical representation of the data from the first computer system via the free space communications link comprises:
obtaining, by the second computer system, optical sensor data regarding the one or more images.

9. The method of claim 8, wherein determining the data based on the optical representation of the data comprises:
determining, by the second computer system, contents of the one or more images based on the optical sensor data, and
determining, by the second computer system, the data based on the contents of the one or more images.

10. The method of claim 9, wherein determining the data based on the contents of the one or more images comprises:
generating one or more files based on the contents of the one or more images.

11. The method of claim 10, wherein transmitting the data to the one or more additional computer systems via the second communications network comprises:

transmitting the one or more files to the one or more additional computer systems via the second communications network.

12. The method of claim 11, wherein transmitting the one or more files to the one or more additional computer systems via the second communications network comprises:
transmitting the one or more files to a storage area network (SAN) implemented by the one or more additional computer systems.

13. The method of claim 1, wherein accessing data for transmission to the second computer system comprises:
receiving, by the first computer system, a plurality of files, and
aggregating, by the first computer system, contents of the files to determine the data for transmission to the second computer system.

14. The method of claim 1, wherein the first communications network is associated with a first set of network security restrictions, and wherein the second communications network is associated with a second set of network security restrictions different from the first set of network security restrictions.

15. The method of claim 14, wherein the second set of security restrictions is greater than the first set of security restrictions.

16. The method of claim 1, wherein there is an absence of wired communications links communicatively coupling the first computer system and the second computer system.

17. The method of claim 1, wherein there is an absence of wireless radio communications links coupling the first computer system and the second computer system.

18. The method of claim 1, wherein there is an absence of Internet Protocol (IP) communications links coupling the first computer system and the second computer system.

19. A system comprising:
a first computer system comprising a plurality of optical writers; and
a second computer system comprising a plurality of optical readers,
wherein the first computer system is configured to:
access, via a first communication network, data for transmission to the second computer system, wherein the data comprises textual information,
generate an optical representation of the data, wherein the optical representation of the data comprises one or more images depicting the textual information, and
present, using the plural of optical writers, the optical representation of the data to the second computer system via a free space communications link, and
wherein the second computer system is configured to:
receive, using the plurality of optical readers, the optical representation of the data from the first computer system via the free space communications link, wherein each of the optical readers receives the optical representation of the data from a different respective one of the optical writers,
determine the data based on the optical representation of the data, wherein at least a portion of the data is determined based on optical character recognition of the one or more images, and
transmit the data to one or more additional computer systems via a second communications network.

20. One or more non-transitory computer readable media storing instructions that, when executed by one or more processors, cause the one or more processors to perform operations comprising:

causing a first computer system to access, via a first communication network, data for transmission to a second computer system, wherein the data comprises textual information;

causing the first computer system to generate an optical representation of the data, wherein the optical representation of the data comprises one or more images depicting the textual information;

causing the first computer system to present, using a plurality of optical writers, the optical representation of the data to the second computer system via a free space communications link;

causing the second computer system to receive, using a plurality of optical readers, the optical representation of the data from the first computer system via the free space communications link, wherein each of the optical readers receives the optical representation of the data from a different respective one of the optical writers;

causing the second computer system to determine the data based on the optical representation of the data, wherein at least a portion of the data is determined based on optical character recognition of the one or more images; and causing the second computer system to transmit the data to one or more additional computer systems via a second communications network.

* * * * *